United States Patent
Gershenson

[11] Patent Number: 5,358,638
[45] Date of Patent: Oct. 25, 1994

[54] MULTIPLE LAYER FILTER BAG INCLUDING ABRASION-RESISTANT MATERIAL

[75] Inventor: Moshe Gershenson, Mohegan Lake, N.Y.

[73] Assignee: ISP Investments Inc., Wilmington, Del.

[21] Appl. No.: 112,727

[22] Filed: Aug. 27, 1993

[51] Int. Cl.⁵ .............................................. B01D 29/27
[52] U.S. Cl. ...................................... 210/448; 210/452; 210/453
[58] Field of Search ............... 210/448, 451, 452, 453; 55/381, 382

[56] References Cited

U.S. PATENT DOCUMENTS

| | | | |
|---|---|---|---|
| 3,765,536 | 10/1973 | Rosenberg | 210/446 |
| 4,188,197 | 2/1980 | Amberkar et al. | 55/382 |
| 4,861,353 | 8/1989 | Wyss | 55/382 |
| 5,075,004 | 12/1991 | Gershenson et al. | 210/445 |
| 5,244,703 | 9/1993 | Bosses | 55/382 |

*Primary Examiner*—Frank Spear
*Assistant Examiner*—W. L. Walker
*Attorney, Agent, or Firm*—Richard T. Laughlin; Anthony Lagani, Jr.; Joshua J. Ward

[57] ABSTRACT

A filter apparatus having a bag filter subassembly for collecting contaminating material. The bag filter subassembly includes a bag filter unit and an integral collar. The bag filter unit has an outer layer having mesh of selective strand size and selective pore size to give added strength to the bag.

6 Claims, 3 Drawing Sheets

MULTIPLE LAYER FILTER BAG INCLUDING ABRASION-RESISTANT MATERIAL

The invention relates to a filter bag unit and, in particular, the invention relates to a filter bag unit having a four-chamber, four-layer filter bag having increased efficiency.

BACKGROUND OF THE INVENTION

The prior art filter apparatus having a bag unit with a resilient gasket is described in U.S. Pat. No. 5,075,004, issued Dec. 24, 1991. Related patents include U.S. Pat. Nos.:
U.S. Pat. No. 3,771,664, issued Nov. 13, 1973,
U.S. Pat. No. 4,133,769, issued Jan. 9, 1979,
U.S. Pat. No. 4,204,966, issued May 27, 1980,
U.S. Pat. No. 4,259,188, issued Mar. 31, 1981,
U.S. Pat. No. 4,285,814, issued Aug. 25, 1981,
U.S. Pat. No. 4,419,240, issued Dec. 6, 1983,
U.S. Pat. No. 4,460,468, issued Jul. 17, 1984,
U.S. Pat. No. 4,842.739, issued Jun. 27, 1989,
U.S. Pat. No. 4,490,253, issued Dec. 25, 1984,
U.S. Pat. No. 4,669,167, issued Jun. 2, 1987, and
U.S. Pat. No. 5,039,410, issued Aug. 13, 1991.

The prior art filter apparatus generally have a bag with a resilient gasket including a housing, a cover plate, a basket, and a bag filter subassembly. The bag filter subassembly has a bag composed of filter material such as paper or cloth and a resilient seal member. The filter bag is conventionally a three-layer bag unit, which has a first inner layer, a second middle filtration layer, and a third spun fiber outer layer.

One of the major problems with the prior art filter apparatus is that it is difficult to remove the bag filter subassembly, when loaded, due to locking or bonding of the three-layer bag unit to the perforations in the metal basket holder. This occurs because the filter material bag, due to the pressure of the liquid flow, forces the filter material into the outlet holes or mesh of the basket. Considerable force is required to free the bag which can result in the rupturing of the bag and the contamination of the line.

Another problem is that the filters bags are difficult to manufacture because the outer layer is easily damages and this same condition prevails in packaging and shipping, as well as during installation.

A further problems with the prior art filter apparatus is that fiber shedding can occur from the outer surface of the third layer as this surface because it can be easily damaged. This results in fibers migrating into the clean filtrate with the resulting contamination.

OBJECTS OF THE INVENTION

One of the objects of the present invention is to provide a filter apparatus wherein locking of the filter bag unit to the basket is minimized.

Another object of the present invention is to provide a filter apparatus which has added strength in manufacturing, handling, packaging and installation.

A further object of the invention is to provide a filter apparatus wherein the breaking off and migration of the loose fibers into the clean filtrate is minimized.

The foregoing and other objects, features and advantages of the invention will be apparent from the following description of the preferred embodiment of the invention as illustrated in the accompanying drawings.

SUMMARY OF THE INVENTION

According to the present invention, a filter apparatus is provided. The filter apparatus comprises an enclosure subassembly having a housing and a cover plate, a basket subassembly having a basket portion and an annular member with a seal portion. The basket portion is usually made of perforated metal or a woven mesh. The filter subassembly has a filter bag unit and a resilient or thermoplastic collar, the filter bag unit being a four-layer unit with a first inner layer and a second filtration layer and a third layer of spun-bonded fibrous material and a fourth layer of seamless sleeve thermoplastic composition netting. The netting is preferably made by an extrusion process through a die which creates the porous structure.

The use of the fourth layer of continuous, extruded, seamless sleeve netting eliminates or substantially reduces the problem of locking of the filter bag unit in the perforations or weave of the filter basket. Further, the filter bag has added strength in manufacturing, handling, packaging and installation. The outer layer of the filter is protected to minimize the breaking off and migration of the loose fibers into the clean filtrate.

DESCRIPTION OF THE PREFERRED EMBODIMENT

Figure 1:
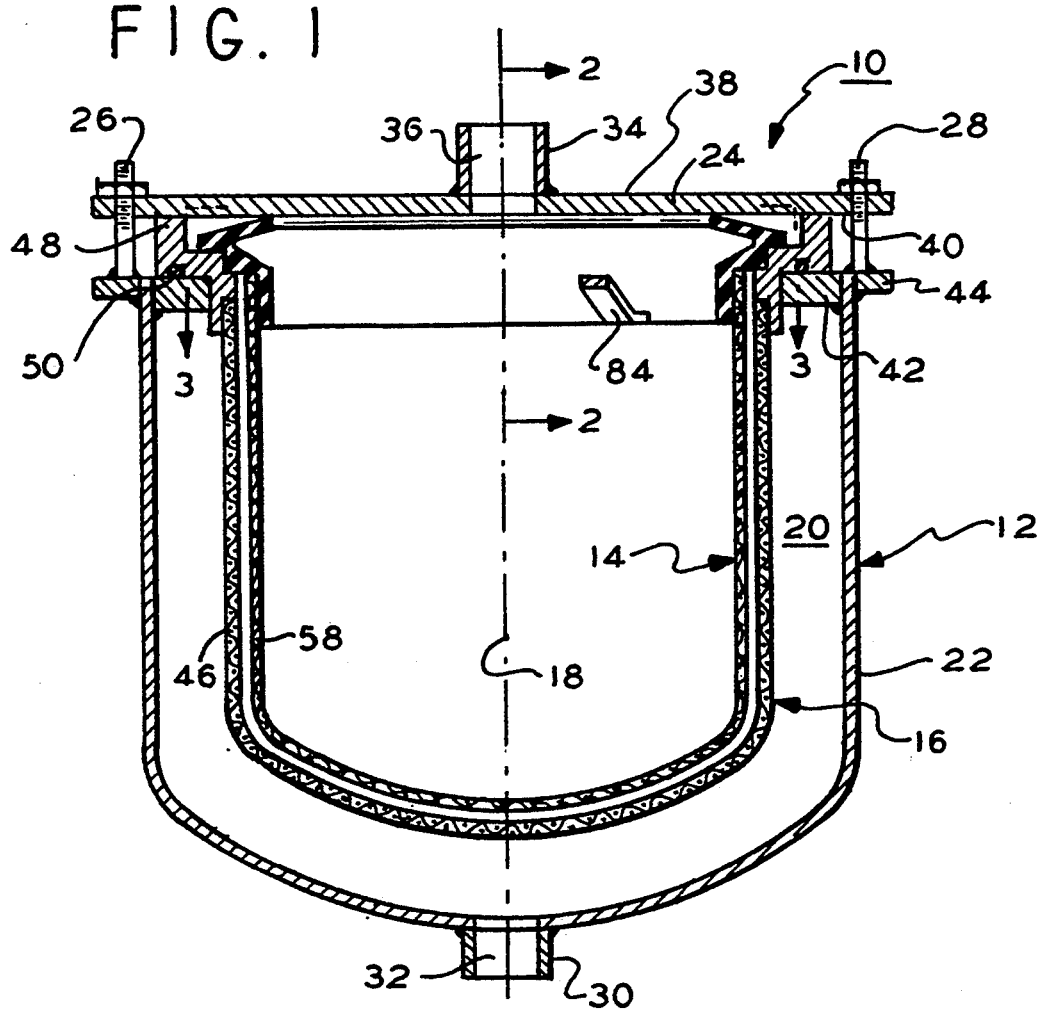
FIG. 1 is a vertical section view of a filter apparatus according to the invention.

As shown in FIG. 1, a pressure filtration apparatus 10 is provided. The apparatus generally indicated at 10 includes an enclosure subassembly 12, a basket subassembly 16, and a bag filter subassembly 14, which are coaxial about an axis 18. Enclosure subassembly 12 is a pressure vessel.

The enclosure subassembly 12, encloses a chamber 20, and has a housing 22 and a cover plate 24, which has a plurality of hold-down bolts 26, 28 with associated nuts or fasteners. Housing 22 also has an outlet pipe 30 with an outlet passage 32 from chamber 20. The cover plate 24 has an upper surface 38 and a lower surface 40 with an inlet pipe 34 with an inlet passage 36 to chamber 20.

The housing 22 also has an inner flange or support bracket 42, which supports basket subassembly 16 and has an outer flange 44, which supports bolts 26, 28.

Figure 2:
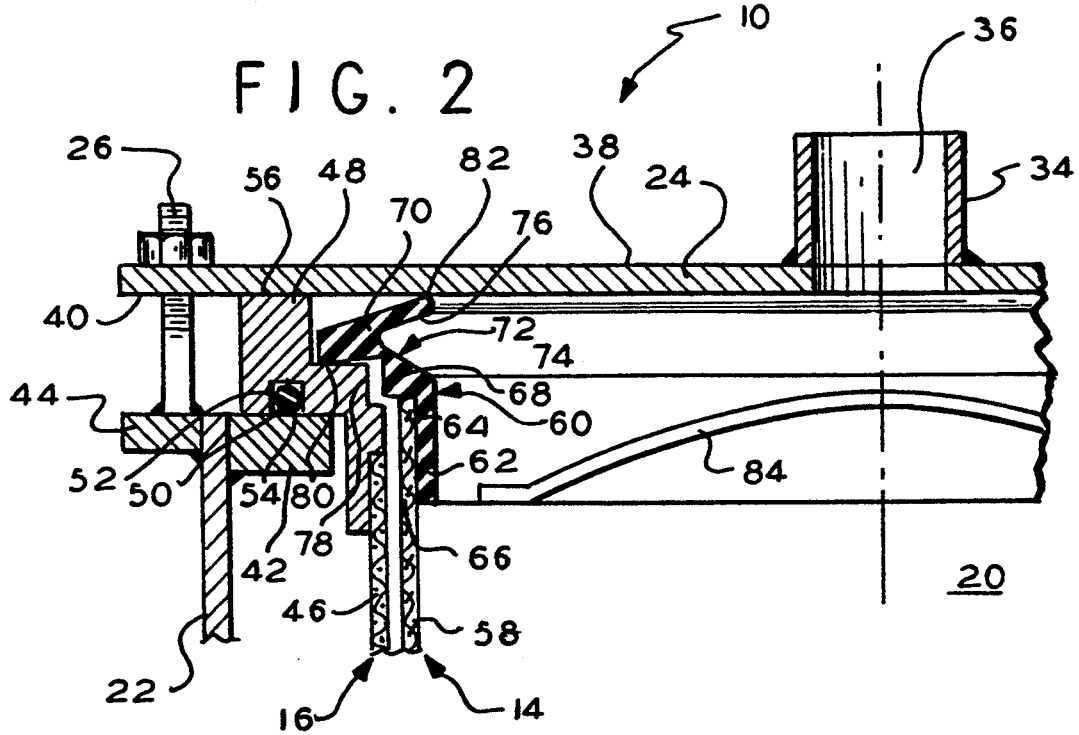
FIG. 2 is a portion of FIG. 1.
Figure 4:
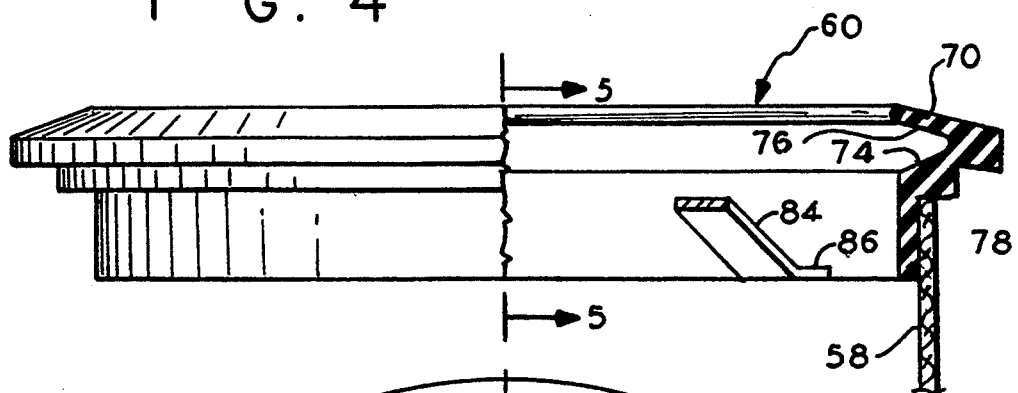
FIG. 4 is a section view as taken along the line 4—4 of FIG. 3.
Figure 3:
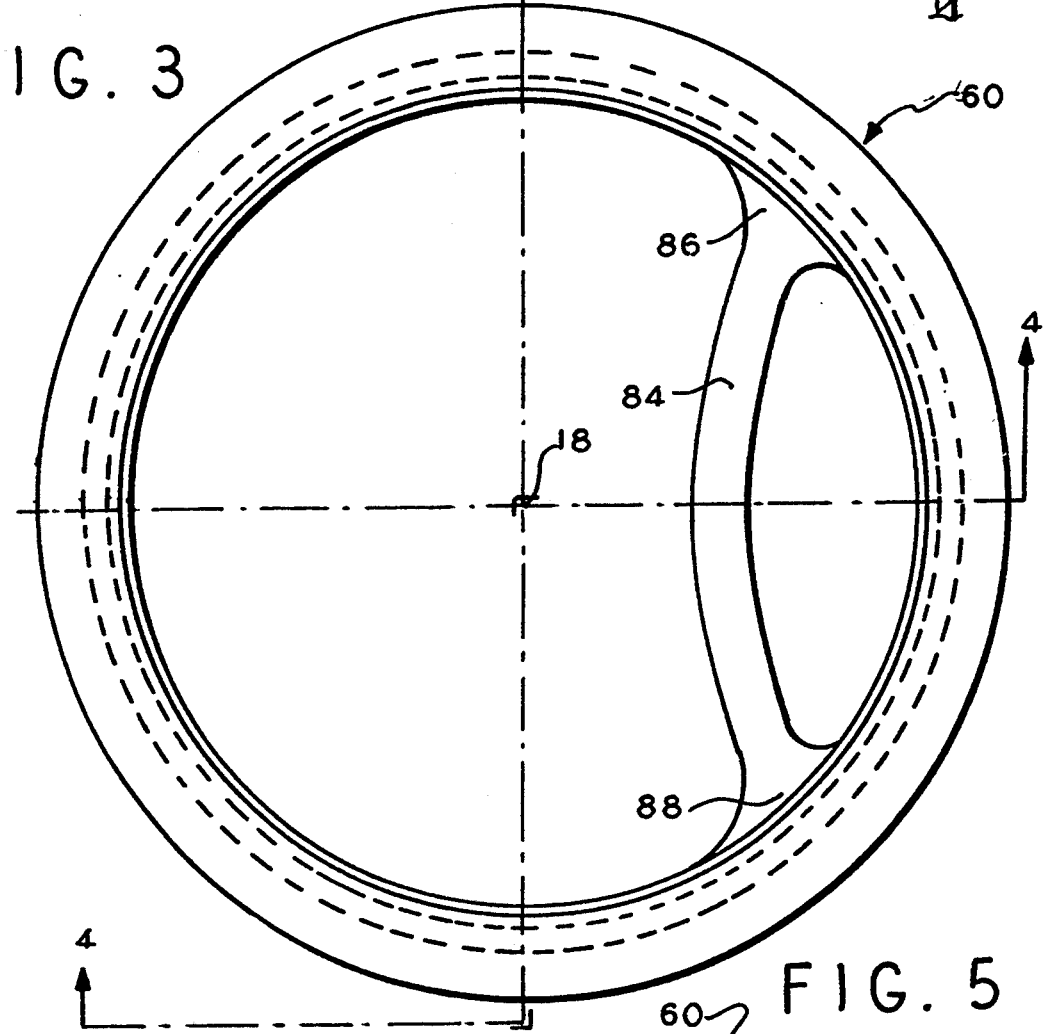
FIG. 3 is a plan section view as taken along the line 3—3 of FIG. 1.
Figure 5:
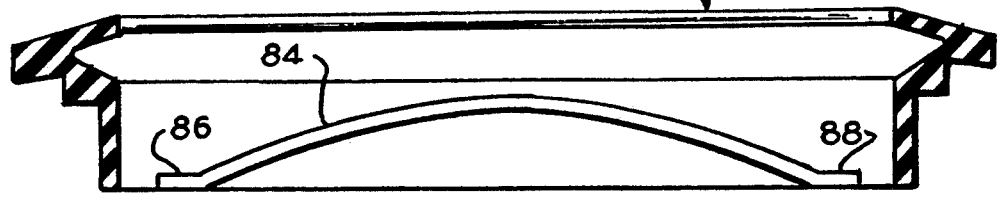
FIG. 5 is a section view as taken along the line 5—5 of FIG. 4.

As shown in FIG. 2, the basket subassembly 16 has a basket portion 46, and has an annular member 48, which has an O-ring 50 of rubber-like material. Annular member 48 has an underside surface 52, which has a groove 54 that receives O-ring 50. Annular member 48 is fixedly connected to and supports basket portion 46. Annular member 48 also has an upper bearing surface 56. Annular member 48 bears on O-ring 50, which bears on inner flange 42.

Filter subassembly 14 has a filter bag 58 and a seal ring or integral collar 60. Collar 60 is made of a molded rubber or thermoplastic material. Collar 60 has a lower flange portion 62, which has a ring-shaped one-sided recess 64 that receives a top end portion 66 of filter bag 58. Collar 60 also has a middle portion 68 and a top lip portion 70. Bag 58 is attached to portion 62 by sewing stitches and/or by heat sealing. Middle portion 68 and top lip portion 70 together form a circumferential cavity or inner groove 72. Groove 72 has a slanted lower sidewall 74 and a slanted upper sidewall 76. Top lip portion 70 and middle portion 68 have a pivotal web portion 78 therebetween, for pivoting of portion 70 relative to portion 68. Top lip portion 70 forms a bottom ring-shaped sealing area 80 with portion 48, and forms a top ring-shaped sealing area 82 with cover plate 24, due to internal pressure forces on sidewalls 74, 76.

Collar 60 also has a handle 84 for lifting bag 58 from chamber 20. Handle 84 has flared end portions 86, 88, each of which is integrally molded with collar 60 and is connected to lower portion 62.

Collar 60 is retained between cover plate 24 and annular member 48. Liquid pressure inside bag 58 exerts a force on each of the sidewalls 74 and 76. Such forces flex lip portion 70 and cause the formation of a substantially leak-proof sealing between lip portion 70 and cover plate 24. A lever-type action about the web portion 78 causes a seal area 80 between the underside of lip portion to an annular member 48 and causes a seal area 82 between the top of lip portion 70 and cover plate 24. The higher the internal pressure, the higher is the sealing force exerted on cover plate 24 and on annular member 48.

Handle 84 curves upwardly away from its end portions 86, 88. Handle 84 at the center portion, between end portions 86, 88, is relatively close to the top of collar 60, and near to top of basket member 48.

Figure 6:
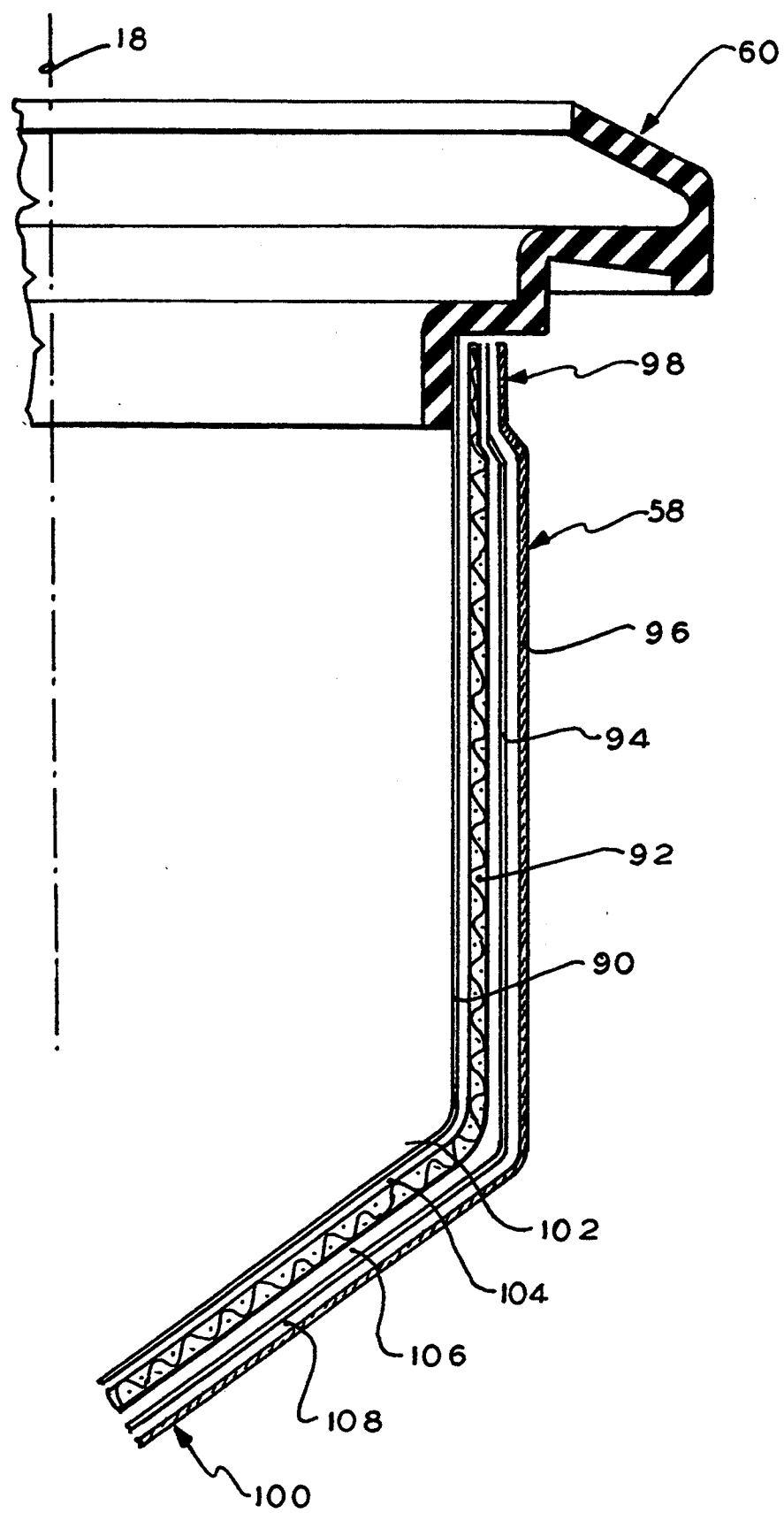
FIG. 6 is a portion of FIG. 3 showing the triangular shape of the bottom of the bag.

As shown in FIG. 6, according to the invention, filter bag unit 58 has a first layer or spun-bonded bag 90, a second layer or filtration bag 92, a third layer or spun-bonded bag 94, and a fourth layer or extruded mesh bag 96. Second layer 92 is disposed radially outwardly and next to first layer 90. Third layer 94 is disposed radially outwardly and next to second layer 92. Fourth layer 96 is disposed radially outwardly and next to third layer 94.

Layers 90, 92, 94, 96 have, at their top ends, an ultrasonically-formed or thermally-formed weld 98 at collar 60. Layers 90, 92, 94, 96 have, at their bottom ends, an ultrasonically-formed or thermally-formed weld 100 or the like. Weld 100 is formed adjacent to axis 18. Weld 100 may be a composite single weld or may have separate, respective welds. Layers 90, 92, 94, 96 form first and second and third and fourth chambers 102, 104, 106, 108.

First layer 90 has a spun-bonded material. Second layer 92 has a melt-blown material. Third layer 94 has a spun-bonded material. Fourth layer 96 has a continuous, extruded, seamless sleeve netting with a pore size of approximately 325 microns and a strand diameter of approximately 200 microns.

The purpose of first layer 90 is to provide integrity to the interior of the bag and to protect the filtration material from erosion due to the impact and velocity of the liquid pumped into the filter. Second layer 92 is composed of a graded pore structure material with a pore which decreases in size from the inside towards the outside. Third layer 94 has a spun-bonded material which physically protects and contains the second filtration layer 92 and reduces friction by as much as 50%.

The material of second layer 92 is a melt-blown material, which has fairly short intertwined fibers that are joined and melted together. Third layer 94 is made of a spun-bonded material which has continuously blown fibers. Third layer 94 has points of interception which are melt-joined. The pore size of the spun-bonded material of first layer 90 is normally larger than that of the filtration material of second layer 92, so that first layer 90 does not affect the final filtration results. All four layers 90, 92, 94, 96 are welded thermally or ultrasonically on the top edge portions and on the bottom edge portions and on the side edge portions to form a multi-layered closed sleeve or bag unit.

Fourth layer 96 has practically no loose individual fibers so that migration of fibers into the filtered liquid is avoided. Fourth layer 96 has strands which are fairly large in diameter so that physical damaging or breaking of individual fiber strands is minimized. Any damaged fibers on the outer surface of third layer 94 are normally more than 500 microns in length, so that such fibers are parallel to and are flattened by the adjacent inner surface of fourth layer 96, and do not protrude through fourth layer 96, and do not come loose during the filtration process. Fourth layer 96 prevents damage to third layer 94 before and during installation. Fourth layer 96 has netting of pore size which is larger than the pore size of third layer 94 so that interference with the filtering is avoided.

The advantages of apparatus 10 are indicated hereafter.

A) Bag unit 60 minimizes the difficulty of separation from and locking to basket 46.

B) Fourth layer 96 has mesh having strands of selective diameter and pores of selective width, thereby minimizing a locking, or resistance to removal, of bag unit 60 from basket 46, when bag unit 60 is full.

C) Bag unit 60 minimizes filter contamination of filtered liquid.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. In a filter apparatus for filtering particles from a liquid comprising:

an enclosure subassembly having an axis and having a housing with a top flange and having a cover plate connected to the housing;

a basket subassembly having a basket portion and having an annular ring in sealing engagement with the top flange; and a bag filter subassembly having a filter bag unit and an integral collar; the improvement which minimizes basket locking comprising a filter bag unit having four layers, the first layer of abrasion-resistant material being the farthest from the basket, the second layer of filtration material disposed next to and radially outwardly of the first layer, the third layer of physically protective material disposed next to and radially outwardly of the second layer and the fourth outer layer adjacent to the basket of mesh material with a strand diameter which is substantially larger than a strand diameter of the fiber of the third layer and with a pore width which is substantially larger than a pore width of the fiber of the third layer.

2. The apparatus of claim 1 wherein
the first layer and second layer and third layer and fourth layer have respective top edge portions which are joined together and to the integral collar by a weld and have respective side edge portions and bottom edge portions which are joined together by respective weld portions.

3. The apparatus of claim 1, wherein
the first layer and second layer and third layer and fourth layer have respective chambers through which fluid passes for removal of contaminants.

4. The apparatus of claim 1, wherein
the fourth layer is an extruded netting with a strand diameter of about 200 microns and a pore size of about 325 microns.

5. (Amended) In a filter apparatus for filtering particles from a liquid comprising:
an enclosure subassembly having an axis and having a housing with a top flange and having a cover plate connected to the housing;
a basket subassembly having a basket portion and having an annular ring in sealing engagement with the top flange; and
a bag filter subassembly and a collar in sealing engagement with the annular ring and with the cover plate;
said collar having at least one elongated hand and a radial inner face;
said handle having opposite end portions, each end portion having an arcuate flexible connection to the radially arranged inner face;
whereby an axial lifting force on handle is disposed parallel to and slightly offset from the filter bag tension force for minimizing twisting of the gasket ring; and
said collar having a lower portion fixedly connected to the filter bag and having a middle portion supported by the annular ring and having a top lip portion engaging the cover plate;
said collar having an inner surface with an inner groove having a lower sidewall disposed adjacent to the middle portion and having an upper sidewall disposed adjacent to the top lip portion;
said collar having a pivotable web portion disposed between the middle portion and the top lip portion;
whereby forces normal to the groove sidewalls due to internal pressure within the bag filter subassembly pivots the top lip portion about the pivotable web portion causing a sealing ring area of the lip portion on the cover plate and causing a sealing ring area of the lip portion on the annular member; the improvement which minimizes basket locking comprising a filter bag unit having four layers, the first layer of abrasion-resistant material being the farthest from the basket, the second layer of filtration material disposed next to and radially outwardly of the first layer, the third layer of physically protective material disposed next to and radially outwardly of the second layer and the fourth outer layer adjacent to the basket of mesh material with a strand diameter which is substantially larger than a strand diameter of the fiber of the third layer and with a pore width which is substantially larger than a pore width of the fiber of the third layer,
said outer layer having mesh pore width being substantially larger in size than a pore of the third layer;
said strand diameter of the fourth layer being about 200 microns; and
said mesh pore width of the fourth layer being about 325 microns.

6. The apparatus of claim 5, wherein
said fourth layer is a mesh of continuous, extruded plastic.

* * * * *